United States Patent [19]

Hart

[11] Patent Number: 4,471,614
[45] Date of Patent: Sep. 18, 1984

[54] HYDRO-PNEUMATIC ACTUATOR WITH AUTOMATIC SLACK ADJUSTER

[75] Inventor: James E. Hart, Trafford, Pa.

[73] Assignee: American Standard Inc., Wilmerding, Pa.

[21] Appl. No.: 385,736

[22] Filed: Jun. 7, 1982

[51] Int. Cl.$^3$ .............................................. B60T 11/20
[52] U.S. Cl. ...................................... 60/562; 60/585; 60/591; 60/593
[58] Field of Search ................ 60/560, 563, 593, 591, 60/585, 562

[56] References Cited

U.S. PATENT DOCUMENTS

| | | |
|---|---|---|
| 2,587,023 | 2/1952 | Allyn . |
| 2,941,366 | 6/1960 | Porter .............................. 60/563 |
| 3,406,519 | 10/1968 | Hackett ........................... 60/563 |
| 3,513,656 | 5/1970 | Engle . |
| 3,633,365 | 1/1972 | Belkrap ............................ 60/560 |
| 3,832,851 | 9/1974 | Kiernan ........................... 60/563 |
| 4,012,080 | 3/1977 | Engle ............................... 60/593 |

*Primary Examiner*—Abraham Hershkovitz
*Attorney, Agent, or Firm*—Gary J. Falce

[57] ABSTRACT

A hydro-pneumatic actuator for providing a two-stage buildup of the hydraulic output pressure. A primary hydraulic piston, to which a pneumatic input piston actuator is connected, acts in a larger bore of a hydraulic cylinder to transfer fluid via a central passage in a spring-loaded, differential area, secondary hydraulic piston, that is coaxially disposed in the hydraulic cylinder in spaced-apart relationship with, and downstream of, the primary piston. A larger face of the secondary piston is in the larger bore and the smaller face is in a reduced diameter bore of the hydraulic cylinder, so that a pressure buildup in the hydraulic cylinder effects actuation of the secondary piston to close a check valve and thereby inter-fluid communication between the larger and smaller bores of the hydraulic cylinder via the central passage. The smaller face of the secondary piston is therefore effective to transmit the hydraulic force with a high gain multiplication factor following attainment of an initial predetermined force in low gain.

The arrangement includes a displacement cylinder to measure the pneumatic piston stroke and an expansion chamber into which fluid is drawn from the reservoir when piston stroke is excessive for subsequent transfer to the hydraulic cylinder.

7 Claims, 1 Drawing Figure

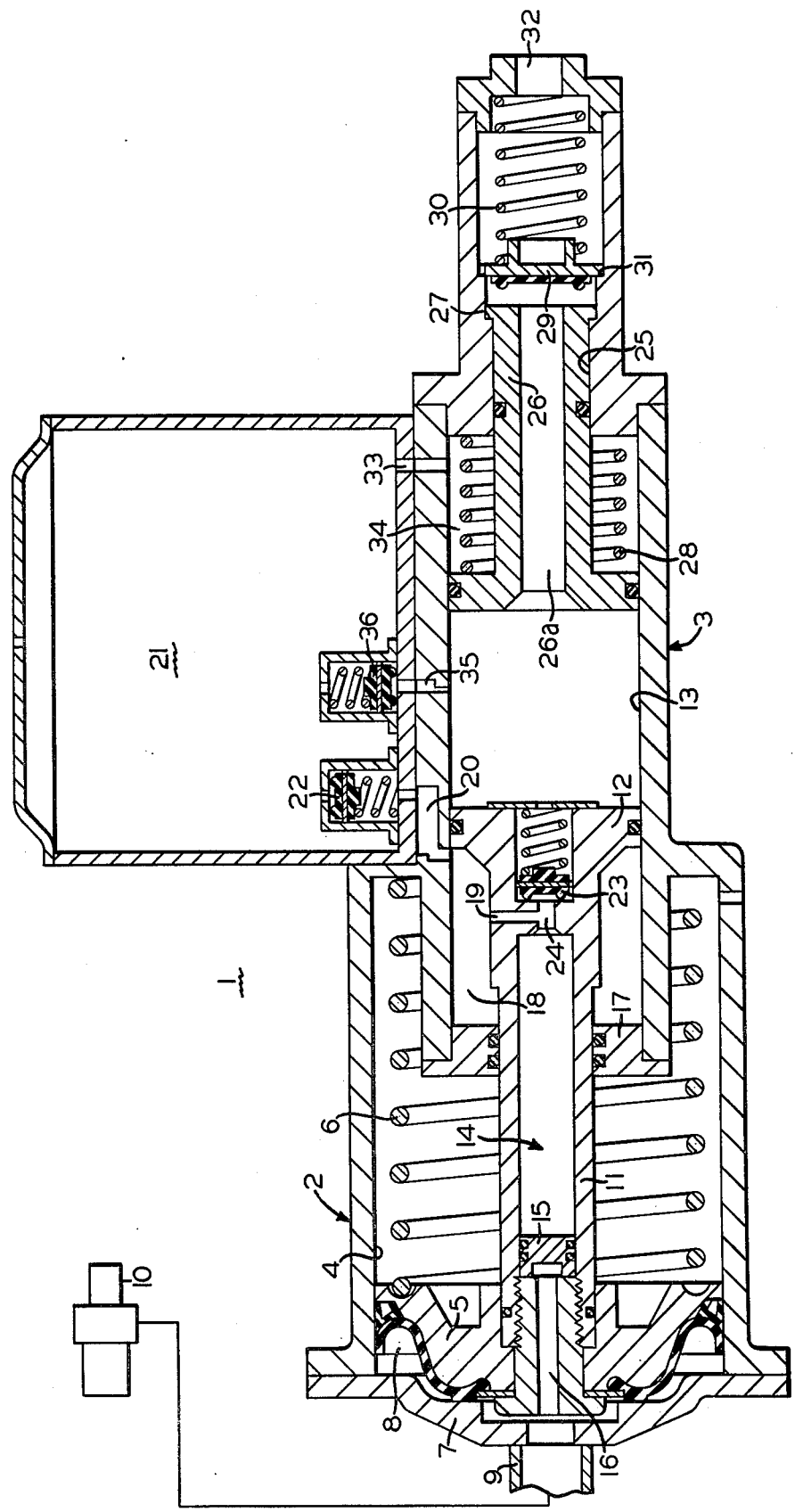

HYDRO-PNEUMATIC ACTUATOR WITH AUTOMATIC SLACK ADJUSTER

BACKGROUND OF THE INVENTION

The present invention is related to hydro-pneumatic type brake actuators and more particularly to brake actuators of the above type, which are suitable for use in freight type railway brake systems.

At the present time, railroads typically employ traditional automatic air brake systems. Each car in a train is normally equipped with auxiliary and emergency reservoirs which are charged from a brake pipe extending through the train, and a control valve which responds to changes in the brake pipe pressure to control the flow of air to and from the car brake cylinders. Since the railroad industry has standardized on relatively low braking pressures, and practical considerations limit the diameter of the car brake cylinders, it has become necessary to employ force-multiplying linkages between the brake cylinder and brake shoes in order to obtain the high braking forces required at the brake shoes. Such a brake rigging arrangement inherently increases the stroke of the brake cylinder piston required to move the brake shoes enough to take up the clearance space between the brake shoes and wheel treads. Accordingly, the brake cylinder clearance volume, or in other words the piston stroke required to bring the shoes into wheel contact, must be relatively large and thus requires a considerable amount of air. This in turn requires relatively large air reservoirs, which are space consuming and thus impose a further restriction on the area needed for the force-multiplying brake rigging.

The gradual acceptance of hydraulic brake systems in the rapid transit segment of the railway industry suggests the possibility of using hydraulics as a means of transmitting brake forces to the brake shoes in freight type service. Such an approach would be advantageous in eliminating the need for the cumbersome, mechanical brake rigging presently employed on freight cars to transmit the brake cylinder forces to the brake shoes. Ideally, such an arrangement would require only a single hydro-pneumatic actuator device on each car corresponding to the brake cylinder in a conventional mechanical brake rigging system. Mechanical advantage sufficient to obtain the desired high brake shoe forces would be obtained by a large ratio piston of the hydraulic actuator. Because of this high ratio piston and the brake shoe clearance to be taken up, the stroke of the actuator piston in the hydraulic actuator would be necessarily large, and thus require a considerable amount of air simply to bring the brake shoes into braking engagement with the wheel treads. This would unduly enlarge the size of the hydraulic actuator, as well as require relatively large air reservoirs.

SUMMARY OF THE INVENTION

The object of the present invention is to provide a compact, low-cost, yet highly reliable hydro-pneumatic brake actuator device having a high ratio input to output hydraulic pressure developed in two-stages, in order to reduce the piston stroke required to take up the clearance between the brake shoes and wheel treads of a railway vehicle.

Another object of the invention is to provide a hydro-pneumatic actuator of the above type, which automatically compensates for variations in the clearance between the brake shoes and wheel treads due to brake shoe wear or replacement, for example, in order to maintain the stroke of the pneumatic piston and thus the air demand constant.

Briefly, the hydro-pneumatic actuator according to the present invention converts an input force, such as the pneumatic output of an air brake control valve device, into a proportionally higher hydraulic pressure. During the first stage of operation, a pneumatic piston drives a primary hydraulic piston having a relatively large pressure area in order to obtain a large volumetric displacement of hydraulic fluid for a given displacement of the pneumatic piston. The pneumatic piston displacement is such that when brake shoe/wheel engagement occurs, the primary hydraulic piston will simultaneously develop hydraulic force to actuate a secondary hydraulic piston having a smaller pressure area than the primary piston pressure area. This results in a higher force multiplication being obtained after the brake shoe clearance has been taken up. The initial multiplication ratio in effect during movement of the brake shoes into braking engagement permits a shorter piston stroke and therefore less air consumption.

Overtravel of the pneumatic piston is compensated for by drawing hydraulic fluid from the reservoir into a fixed volume displacement chamber during the application stroke. In the event overtravel occurs due to brake shoe or wheel wear, the hydraulic fluid drawn from the reservoir is forced into the hydraulic system to make up for the additional slack created by the shoe/wheel wear. In the event of undertravel, as occurs following brake shoe changeout, the excess hydraulic fluid in the hydraulic system is forced back into the reservoir through the pressure relief check valve during the application stroke.

BRIEF DESCRIPTION OF THE DRAWING

The foregoing objects and further advantages will become apparent from the following more detailed explanation of the invention when taken with the single FIGURE drawing showing a sectional view of a two-stage, hydro-pneumatic brake actuator arranged to include an automatic, double-acting slack adjuster.

DESCRIPTION AND OPERATION

The hydro-pneumatic brake actuator 1 comprises a pneumatic cylinder 2 and a hydraulic cylinder 3. Reciprocally disposed within a bore 4 of pneumatic cylinder 2 is a pneumatic piston 5 having a return spring 6 that urges the pneumatic piston toward its release position, as shown. An end cover 7 cooperates with cylinder 2 and piston 5 to form an actuator chamber 8 to which air may be connected via a pipe fitting 9 in end cover 7. For example, a standard AB, ABD, or ABDW type air brake control valve device 10 may be employed as the source of control air supplied to fitting 9.

A hollow push rod 11 connects piston 5 to a primary hydraulic piston 12 that operates in a bore 13 of hydraulic cylinder 3. The hollow of push rod 11 forms a displacement cylinder 14 having a displacement piston 15. A passageway 16 in piston 5 connects chamber 8 to the face of piston 15. As viewed in the drawing, the left side of hydraulic piston 12 cooperates with cylinder 3 and an end wall 17, through which hollow push rod 11 passes, to form an expansion chamber 18. A passageway 19 in the forward end of displacement chamber 14 is connected to expansion chamber 18. Another passageway 20 connects expansion chamber 18 to a reservoir 21 in which hydraulic fluid is stored. A one-way check valve 22 permits fluid to flow from reservoir 21 to expansion chamber 18 and prevents fluid flow in the opposite direction. Another one-way check valve 23 in a branch passage 24 of passage 19 connects hydraulic fluid from displacement cylinder 14 to the hydraulic cylinder 3 and prevents fluid flow in the opposite direction.

In addition to bore 13, hydraulic cylinder 3 includes a reduced diameter bore 25. A secondary hydraulic piston 26 having a through passage 26a operates in hydraulic cylinder 3, with one end constituting a piston operating in bore 13 and the opposite end constituting a reduced diameter piston operating in bore 25. A stop 27 in bore 25 locates secondary piston 26 in spaced-apart relationship with primary piston 12 under the influence of a bias spring 28. A second stage check valve 29 is biased by a spring 30 aganst a stop 31 in bore 25, so as to be normally spaced-apart from the reduced diameter piston face of secondary hydraulic piston 26 by a slight amount when piston 26 is against stop 27. An outlet port 32 is provided in hydraulic cylinder 3 for connection to the hydraulic lines leading to the wheel brake cylinders in a railway vehicle brake system, for example. Also, a passage 33 opens into bore 13 behind the larger piston face of secondary piston 26 to connect hydraulic fluid from reservoir 21 to a chamber 34 containing spring 28. Another passage 35 opens into bore 13 between the hydraulic pistons 12 and 26 to connect hydraulic fluid from reservoir 21 to hydraulic cylinder 3 via a one-way check valve 36.

In an air brake controlled, hydraulic brake system for freight cars, the hydro-pneumatic actuator device 1 of the present invention responds to the air pressure from the air brake control valve device 10. This air pressure is supplied to chamber 8 and actuates pneumatic piston 5 in a rightward direction against the force of return spring 6. During the first stage of operation, the primary hydraulic piston 12, which is directly driven by pneumatic piston 5, displaces a relatively large volume of hydraulic fluid from cylinder 3 via passage 26a, unseated check valve 29 and outlet port 32. The volumetric displacement of fluid is determined by the distance through which the brake shoes must move to engage the wheel treads for braking and by the size of the pistons in the vehicle brake cylinders that are operated by means of the hydraulic fluid pressure provided by actuator device 1. Passage 35 is located so that piston 12 normally passes just beyond the passage prior to brake shoe/wheel engagement, thus preventing fluid in cylinder 3 from being forced back into reservoir 21 via check valve 36. The bias spring of check valve 36 must be stronger than the resistance offered by the brake rigging to prevent the hydraulic fluid in cylinder 3 from back-dumping into reservoir 21 prior to piston 12 passing over passage 35. The distance hydraulic piston 12 moves during this first stage of operation is such that brake shoe/wheel engagement is intended to occur prior to primary piston 12 engaging secondary piston 26. When shoe/wheel contact is made, any further displacement of primary piston 12 rapidly builds up sufficient hydraulic pressure in cylinder 3 to force secondary hydraulic piston 26 rightwardly against the force of its spring 28 until the smaller face of piston 26 engages second stage check valve 29. This movement of secondary piston 26 is due to the differential pressure area between the larger and smaller piston faces on which the pressurized hydraulic fluid in cylinder 3 acts.

Closure of check valve 29 terminates the first stage of operation, during which a relatively large volume of hydraulic fluid is displaced in hydraulic cylinder 3 for a given unit of travel of pneumatic piston 5, and initiates a second stage of operation, during which a higher force multiplication is achieved than during the first stage of operation. When check valve 29 closes, the hydraulic pressures are generated via the smaller face of secondary piston 26, thus providing a higher input to output multiplication ratio than during the first stage of operation. Since no further hydraulic expansion occurs during this second stage of operation, it will be appreciated that the pneumatic piston stroke is complete and thus the higher force multiplication in effect at this point is of no consequence insofar as affecting the pneumatic piston stroke and thus the air requirement. The two-stage operation thus affords the necessary force multiplication to produce the desired brake shoe forces without the accompanying adverse effect (high air consumption) of a long piston stroke and large piston volume found in single stage actuator devices that are required to produce high ratio input/output forces.

In order to maintain proper brake shoe clearance and piston stroke, an automatic double-acting, hydraulic slack adjusting arrangement is provided, which compensates for over-travel of pneumatic piston 5 due to brake shoe/wheel wear and undertravel due to the replacement of worn brake shoes with new brake shoes. The combined effect of the pneumatic piston actuating air supplied to one side of displacement piston 15 via passage 16 and the reduction of pressure on the other side, brought about by the volumetric increase of expansion chamber 18, as the hydraulic piston 12 advances in bore 13 of cylinder 3, causes displacement piston 15 to force the hydraulic fluid in displacement cylinder 14 into the voided volume of expansion chamber 18 during the stroke of pneumatic piston 5, until displacement piston 15 bottoms out at the end of the displacement cylinder. The volume of fluid in displacement cylinder 15 is exactly equal to the voided volume of expansion chamber 18 for the desired stroke of pneumatic piston 5 required to move the brake shoes into brake engagement with the wheel treads.

If the stroke of pneumatic piston 5 exceeds the desired distance, due to brake shoe/wheel wear having increased the brake shoe clearance, for example, an additional voided volume of expansion chamber 18 will occur as hydraulic piston 12 advances further into hydraulic cylinder 3 than normal. This additional voided volume is supplied with hydraulic fluid from reservoir 21 via check valve 22 and passage 20 until brake shoe/wheel engagement occurs.

During the following release stroke of piston 5 under the influence of return spring 6, in response to air pressure being released from actuating chamber 8 by control valve device 10, hydraulic fluid in expansion chamber 18 is forced back into displacement cylinder 14, as hydraulic piston 12 is retracted in bore 13 of hydraulic cylinder 3, until displacement piston 15 is reset in its leftward-most position. This fluid returned to displacement cylinder 14 is attributed to the desired normal piston travel. Any excess fluid in expansion chamber 18, due to overtravel, is subsequently forced through passages 19 and 24, and check valve 23 into hydraulic cylinder 3 by the continued retraction of hydraulic piston 12. In this way, additional hydraulic fluid consistent with the accumulated overtravel of piston 5, due to brake shoe/wheel wear, is supplied to the hydraulic system to take up the excess clearance space between the brake shoes and wheel treads in order to maintain both the desired shoe clearance and the desired pneumatic piston travel.

When worn brake shoes require replacement, the maintained brake shoe clearance will be reduced by the difference between the new and worn shoe thickness. Consequently, the piston travel will be reduced on the initial brake application following brake shoe changeout. Consequently, brake shoe/wheel engagement will occur prior to hydraulic piston 12 passing over passage 35. Hydraulic fluid force is developed in cylinder 13 sufficient to overcome the bias spring of check valve 36 and thereby accommodate fluid flow into reservoir 21 via passage 35 and check valve 36 to allow continued movement of pneumatic piston 5 and hydraulic piston 12 until the latter crosses passage 35. This reduces the amount of active hydraulic fluid in the hydraulic system to allow increased retraction of the brake shoe during a subsequent brake release to thereby reestablish the desired brake shoe clearance.

From the foregoing description and operation, it will be seen that any leakage of hydraulic fluid past any of the three high-pressure seals in primary piston 12 and the differential pistons of secondary piston 26 will bleed directly or indirectly back into the storage reservoir 21, thus minimizing hydraulic fluid loss.

Having thus described the invention, what I claim as new and desire to secure by Letters Patent, is:

1. A fluid pressure actuator device comprising:
   (a) a hydraulic cylinder having an outlet;
   (b) a hydraulic reservoir;
   (c) a hydraulic piston operatively disposed in said hydraulic cylinder;
   (d) a pneumatic cylinder;
   (e) a pneumatic piston operatively disposed in said pneumatic cylinder to form in cooperation therewith an actuator chamber on one side of said pneumatic piston and an atmospheric chamber on the other side, said actuator chamber having a fitting via which pneumatic fluid under pressure is supplied thereto and released therefrom;
   (f) a hollow push rod interconnecting said pneumatic piston and said hydraulic piston;
   (g) a displacement cylinder formed in the hollow of said push rod and having hydraulic fluid stored therein;
   (h) said hydraulic piston cooperating with said hydraulic cylinder to form a power chamber on one side of said hydraulic piston and an expansion chamber on the opposite side of said hydraulic piston;
   (i) a first passage between said expansion chamber and said displacement cylinder via which the hydraulic fluid in said displacement cylinder is transferred to said expansion chamber as the volume of said expansion chamber increases with actuation of said hydraulic piston to effect said displacement of fluid from said hydraulic cylinder through a predetermined distance of the actuation stroke of said pneumatic piston, such predetermined distance corresponding to complete displacement of fluid from said displacement cylinder;
   (j) a second passage between said reservoir and said expansion chamber;
   (k) first one-way check valve means for conducting hydraulic fluid from said reservoir to said expansion chamber via said second passage in response to a further increase in the volume of said expansion chamber due to overtravel of said hydraulic piston corresponding to the actuation stroke of said pneumatic piston an amount exceeding said predetermined distance;
   (l) a third passage between said displacement cylinder and said power chamber; and
   (m) second one-way check valve means for conducting hydraulic fluid from said expansion chamber to said hydraulic cylinder via said third passage during the return stroke of said pneumatic piston a distance ocorresponding to said over-travel thereof following complete recharge of hydraulic fluid from said expansion chamber to said displacement cylinder.

2. A fluid pressure actuator device as recited in claim 1, further comprising:
   (a) a fourth passage between said reservoir and said power chamber, the position of said opening of said fourth passage into said power chamber relative to said hydraulic piston corresponding substantially to said predetermined distance; and
   (b) a spring-loaded check valve means for transferring hydraulic fluid from said hydraulic cylinder to said reservoir when the fluid pressure in said hydraulic cylinder is sufficient to open said spring-loaded check valve means prior to said hydraulic piston passing over said opening of said fourth passage into said power chamber.

3. A fluid pressure actuator device as recited in claim 1, further comprising:
   (a) a passage in said pneumatic piston connecting said actuator chamber with said displacement cylinder; and
   (b) piston means in said displacement cylinder subject on opposite sides to pneumatic pressure supplied to said actuator chamber and to hydraulic fluid in said displacement cylinder for forcing said transfer of hydraulic fluid from said displacement cylinder to said expansion chamber during said actuation stroke of said pneumatic piston through said displacement distance.

4. A fluid pressure actuator device comprising:
   (a) a hydraulic cylinder having a large diameter bore and a small diameter bore and an outlet in said small diameter bore;
   (b) primary piston means in said large diameter bore for transmitting fluid pressure to said outlet upon actuation thereof;
   (c) a secondary piston axially disposed in said hydraulic cylinder and having a first pressure area subject to fluid pressure in said large diameter bore and a second pressure area subject to fluid in said small diameter bore;
   (d) passage means in said secondary piston between said first and second pressure areas for connecting fluid pressure from said large diameter bore to said small diameter bore; and
   (e) valve means for effecting closure of said passage means including:
      (i) said second pressure area of said secondary piston; and
      (ii) a valve member spaced axially from said second pressure area when said secondary piston is in engagement with said stop and being engageable with said secondary piston at said second pressure area in surrounding relationship with said passage to effect said closure thereof when said secondary piston is moved axially in response to the fluid pressure at said outlet reaching a certain chosen value;

(f) a pneumatic cylinder;

(g) a pneumatic piston operably disposed in said pneumatic cylinder to form in cooperation therewith an actuator chamber on one side of said pneumatic piston and an atmospheric chamber on the other side, said actuator chamber having a fitting via which pneumatic fluid under pressure is supplied thereto and released therefrom;

(h) a hollow push rod interconnecting said pneumatic piston and said primary hydraulic piston;

(i) a displacement cylinder formed in the hollow of said push rod and having hydraulic fluid stored therein;

(j) said primary hydraulic piston cooperating with said hydraulic cylinder to form a power chamber between said first pressure area of said secondary piston and the side of said primary hydraulic piston adjacent thereto, and an expansion chamber on the side of said primary hydraulic piston opposite said power chamber;

(k) a first passage between said expansion chamber and said displacement cylinder via which the hydraulic fluid in said displacement cylinder is transferred to said expansion chamber as the volume of said expansion chamber increases with actuation of said primary hydraulic piston to effect said displacement of fluid from said hydraulic cylinder through a predetermined distance of the actuation stroke of said pneumatic piston, such predetermined distance corresponding to complete displacement of fluid from said displacement cylinder;

(l) a reservoir in which hydraulic fluid is stored;

(m) a second passage between said reservoir and said expansion chamber;

(n) first one-way check valve means for conducting hydraulic fluid from said reservoir to said expansion chamber via said second passage in response to a further increase in the volume of said expansion chamber due to overtravel of said primary hydraulic piston corresponding to the actuation stroke of said pneumatic piston an amount exceeding said predetermined distance;

(o) a third passage between said displacement cylinder and said power chamber; and (p) second one-way check valve means for conducting hydraulic fluid from said expansion chamber to said hydraulic cylinder via said third passage during the return stroke of said pneumatic piston a distance corresponding to said overtravel thereof following complete recharge of hydraulic fluid from said expansion chamber to said displacement cylinder.

5. A fluid pressure actuator device as recited in claim 4, further comprising:

(a) a reservoir in which hydraulic fluid is stored;

(b) said secondary piston cooperating with said large diameter bore to form a non-pressure chamber between said first and second pressure areas; and (c) a passage between said reservoir and said non-pressure chamber via which leakage fluid past said secondary piston is recycled to said reservoir.

6. A fluid pressure actuator device as recited in claim 4, further comprising:

(a) a fourth passage between said reservoir and said power chamber, the position of said opening of said fourth passage into said power chamber relative to said primary hydraulic piston corresponding substantially to said predetermined distance; and (b) a spring-loaded check valve means for transferring hydraulic fluid from said hydraulic cylinder to said reservoir when the fluid pressure in said hydraulic cylinder is sufficient to open said spring-loaded check valve means prior to said primary hydraulic piston passing over said opening of said fourth passage into said power chamber.

7. A fluid pressure actuator device as recited in claim 4, further comprising:

(a) a passage in said pneumatic piston connecting said actuator chamber with said displacement cylinder; and (b) piston means in said displacement cylinder subject on opposite sides to pneumatic pressure supplied to said actuator chamber and to hydraulic fluid in said displacement cylinder for forcing said transfer of hydraulic fluid from said displacement cylinder to said expansion chamber during said actuation stroke of said pneumatic piston through said predetermined distance.

* * * * *

UNITED STATES PATENT AND TRADEMARK OFFICE
CERTIFICATE OF CORRECTION

PATENT NO. : 4,471,614
DATED : September 18, 1984
INVENTOR(S) : James E. Hart

It is certified that error appears in the above-identified patent and that said Letters Patent are hereby corrected as shown below:

Column 6, lines 41-42, delete "dis-placement" and insert --predetermined--

Signed and Sealed this

Seventh Day of May 1985

[SEAL]

Attest:

DONALD J. QUIGG

Attesting Officer     Acting Commissioner of Patents and Trademarks